US009672679B2

(12) United States Patent
Gao et al.

(10) Patent No.: US 9,672,679 B2
(45) Date of Patent: Jun. 6, 2017

(54) DEVICE FOR DETECTING THICKNESS OF SHEET MEDIUM AND METHOD THEREOF

(71) Applicant: GRG Banking Equipment Co., Ltd., Guangzhou, Guangdong (CN)

(72) Inventors: Ping Gao, Guangdong (CN); Ming Li, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/102,232

(22) PCT Filed: Dec. 8, 2014

(86) PCT No.: PCT/CN2014/093233
§ 371 (c)(1),
(2) Date: Jun. 6, 2016

(87) PCT Pub. No.: WO2015/085892
PCT Pub. Date: Jun. 18, 2015

(65) Prior Publication Data
US 2016/0350997 A1    Dec. 1, 2016

(30) Foreign Application Priority Data
Dec. 12, 2013   (CN) .......................... 2013 1 0681220

(51) Int. Cl.
G01B 5/02      (2006.01)
G07D 7/164     (2016.01)
G01B 7/06      (2006.01)

(52) U.S. Cl.
CPC .............. *G07D 7/164* (2013.01); *G01B 7/06* (2013.01)

(58) Field of Classification Search
CPC .................................. G07D 7/164; G01B 7/06
(Continued)

(56) References Cited

U.S. PATENT DOCUMENTS 4,298,807 A     11/1981  Favre
5,293,118 A *   3/1994   Grossmann ............ G01B 7/107
                                                      271/265.04
(Continued)

FOREIGN PATENT DOCUMENTS

CN        201081690 Y    7/2008
CN        101754919 A    6/2010
(Continued)

OTHER PUBLICATIONS

International Search Report for PCT/CN2014/093233, mailed Mar. 6, 2015, ISA/CN.
European Search Report for 14869339.3, mailed Nov. 7, 2016.

*Primary Examiner* — Jonathan C Teixeira Moffat
*Assistant Examiner* — Xiuquin Sun
(74) *Attorney, Agent, or Firm* — Yue Xu; U.S. Fairsky LLP

(57) ABSTRACT

A device for detecting a thickness of a sheet medium is provided, the device is used to improve the sensitivity of the entire sheet medium thickness detection device while eliminating the zero voltage impact by disposing, before an A/D converter, an appropriately amplified subtraction amplification unit used for eliminating the zero voltage impact of thickness voltage. The sheet medium thickness detection device includes a thickness sensor, a position voltage conversion unit, an A/D converter and a control processor which are sequentially connected, and further includes a medium position detection unit, a timer unit, a D/A converter and a subtraction amplification unit. The medium position detecting unit is connected to the control processor and is used to detect whether a detected medium passes through, and the timer unit is connected to the control processor.

7 Claims, 4 Drawing Sheets

(58) Field of Classification Search
USPC .......................................................... 702/170
See application file for complete search history.

(56) References Cited

U.S. PATENT DOCUMENTS

| | | | |
|---|---|---|---|
| 5,678,678 | A | 10/1997 | Brandt, Jr. et al. |
| 8,651,481 | B2 * | 2/2014 | Woodford .............. G07D 7/164 |
| | | | 271/262 |
| 2011/0119015 | A1 | 5/2011 | Hirobe |
| 2011/0309572 | A1 | 12/2011 | Miyamoto |
| 2015/0284205 | A1 | 10/2015 | Gao |

FOREIGN PATENT DOCUMENTS

| | | |
|---|---|---|
| CN | 201653391 U | 11/2010 |
| CN | 102176262 A | 9/2011 |
| CN | 102842166 A | 9/2011 |
| CN | 102466756 A | 5/2012 |
| CN | 102722933 A | 10/2012 |
| CN | 102910468 A | 2/2013 |
| CN | 103064455 A | 4/2013 |
| CN | 103136842 A | 6/2013 |
| CN | 103673961 A | 3/2014 |
| EP | 2860708 A1 | 4/2015 |
| JP | 2006234760 A | 9/2006 |
| WO | 86/00160 A1 | 1/1986 |

\* cited by examiner

DEVICE FOR DETECTING THICKNESS OF SHEET MEDIUM AND METHOD THEREOF

CROSS REFERENCE OF RELATED APPLICATION

The present application is the national phase of International Application No. PCT/CN2014/093233, titled "LAMINATED DIELECTRIC THICKNESS DETECTION DEVICE AND METHOD", filed on Dec. 8, 2014, which claims the priority to Chinese Patent Application No. 201310681220.0, titled "LAMINATED DIELECTRIC THICKNESS DETECTION DEVICE AND METHOD", filed with the Chinese State Intellectual Property Office on Dec. 12, 2013, both of which are incorporated herein by reference in their entireties.

FIELD

The present disclosure relates to the field of thickness detection, and in particular to a device and a method for detecting a thickness of a sheet medium.

BACKGROUND

A thickness measuring device is an instrument for measuring a medium such as sheet medium including a paper or a banknote, and therefore, the thickness measuring device is required to have a high measuring accuracy.

Referring to FIG. 1, an existing measuring device mainly includes a thickness sensor, a location voltage conversion unit, an A/D converter and a control processor. The thickness sensor is configured to detect a thickness of a detected medium, and the control processor is configured to process thickness data of the detected medium and may be connected to an external host device. In operation, the thickness sensor converts the thickness of the detected medium into an output of displacement. In a case where no medium passing the thickness sensor is detected, an output location of the thickness sensor is $X_0$. In a case where a medium with a thickness H passes the thickness sensor, the output location of the thickness sensor is $X_1$. A displacement $\Delta X = X_1 - X_0$ is directly proportional to the thickness H (or the displacement and the thickness have another determined conversion relationship). If a measuring range for the thickness is $0 - H_{max}$, output locations corresponding to the measuring range are $X_0$, $X_{max}$, respectively.

The location voltage conversion unit is configured to convert a location signal outputted from the thickness sensor into an output of voltage signal. In a case where an inputted location is $X_0$, an output voltage $U_0$ corresponding to $X_0$ is referred to as a zero voltage. In a case where the inputted location is $X_{max}$, an output voltage $U_{max}$ corresponding to $X_{max}$ is referred to as a maximal output voltage. It is assumed that a minimal input voltage and a maximal input voltage of the A/D converter are $V_{min}$ and $V_{max}$, respectively, a relationship $V_{min} \leq U_0 < U_{max} \leq V_{max}$ must be met to make sure normal operation of the measuring device. And the measuring device operates in an optimal state in a case that $V_{min} = U_0$ and $V_{max} = U_{max}$.

The above thickness measuring device has the following disadvantages.

I. By Limitation of mechanical machining accuracy and assembly accuracy, output locations $X_0$ of different thickness sensors may fluctuate within a certain range in a case where no medium passes the thickness sensors.

II. In a case that the thickness sensor and the location voltage conversion unit are assembled together, there must be a certain drive mechanism which couples the output location of the thickness sensor to an input terminal of the location voltage conversion unit, since a process of coupling is also affected by the mechanical machining accuracy and the assembly accuracy, the actual location coupled to the input terminal of the location voltage conversion unit is changed, thereby changing the output voltage U0.

III. In a case where multiple thickness measuring devices are installed in one machine, the above factors I and II may cause unconformity between the measuring devices.

IV. The output location $X_0$ and the zero voltage $U_0$ may be changed slowly as an accumulated operating time of the thickness measuring device becomes longer.

An sensitivity of the thickness sensor for the thickness of the detected medium is generally not high, mostly about 1:1, due to high detecting speed and limitation of factors such as dynamic characteristics of a mechanical system. In a case where the detected medium is valuable securities such as a banknote or a check, a thickness of the medium is generally about 100 μm. Then a change value of an output location of the thickness sensor is also about 100 μm. In a case that a measuring error is required to be less than 10%, a total error for the mechanical machining and the assembly is required to be not greater than 10 μm, which is apparently a unreachable requirement for machining and assembling mechanical parts.

Currently, a method for solving zero voltage drift is as follows. In a case that it is predicted that a zero voltage $U_0$ gradually decreases after leaving a factory, the zero voltage is set to be greater than the minimal input voltage of the A/D converter, and the maximal output voltage $U_{max}$ is set to be equal to the maximal input voltage of the A/D converter in the production. In a case that it is predicted that the zero voltage gradually increases after leaving the factory, the zero voltage is set to be equal to the minimal input voltage of the A/D converter, and the maximal output voltage is set to be less than the maximal input voltage of the A/D converter when leaving the factory. In a case that a changing direction of the zero voltage can not be determined or the zero voltage may increases or decreases, the zero voltage needs to be greater than the minimal input voltage of the A/D converter and the maximal output voltage needs to be less than the maximal input voltage of the A/D converter. In most of actual products, the zero voltage may increases or decreases. After leaving the factory, in a case where the zero voltage gradually decreases, the zero voltage may not be less than the minimal input voltage of the A/D converter since a descending space is reserved previously; in a case where the zero voltage gradually increases and a medium passes the thickness sensor, an amplitude of the output voltage of the location voltage conversion unit may be closer to the maximal input voltage of the A/D converter, and the output voltage may not exceed the maximal input voltage of the A/D converter since an ascending space is reserved previously.

In the above method, although the problem that the output voltage of the location voltage conversion unit exceeds the range of input voltage of the A/D converter is solved, the reserved voltage drift space reduces a changing range of a thickness voltage, thereby reducing sensitivity and distinguishability of the measuring device which negatively affects thickness signal analysis by a controller.

For example, it is predicted that the zero voltage of the thickness measuring device drifts in a maximal range from −0.5V to +0.5V, the minimal input voltage of the A/D converter is 0 and the maximal input voltage of the A/D converter is 3.3V. In this case, when leaving the factory, the zero voltage shall be set as 0.5V, and the sensitivity of the measuring device shall be adjusted, such that the maximal output voltage must be less than 2.8V in a case where a thickness of a detected medium is $H_{max}$. Therefore, an amplitude of a net input voltage signal representing the thickness of medium is only 2.3V, and a thickness sensitivity corresponding the amplitude is $2.3/H_{max}$. A range of the input voltage of the A/D converter is 0-3.3V, and therefore, an ideal value of the thickness sensitivity may be $3.3/H_{max}$. It can be seen that, the sensitivity of the thickness measuring device is decreased to 70% of the ideal value due to the zero voltage drift.

SUMMARY

The embodiments of the present disclosure provide a device and a method for detecting a thickness of a sheet medium, in which, before an A/D converter, a subtraction and amplification unit is arranged to eliminate an effect of a zero voltage of a thickness voltage and amplify the thickness voltage appropriately, thereby improving the sensitivity of the device for detecting the thickness of the sheet medium while eliminating the effect of the zero voltage.

The embodiments of the present disclosure provide a device for detecting a thickness of a sheet medium, which includes a thickness sensor, a location voltage conversion unit, an A/D converter and a control processor connected in sequence, the device further including a medium location detecting unit, a timer unit, a D/A converter and a subtraction and amplification unit.

The medium location detecting unit is connected to the control processor and is configured to detect whether a detected medium passes.

The timer unit is connected to the control processor and is configured to record a running time of the device according to a preset rule.

Two terminals of the D/A converter are respectively connected to the control processor and an inverting input terminal of the subtraction and amplification unit, and the D/A converter is configured to convert a digital signal into an analog signal.

A non-inverting input terminal, the inverting input terminal and an output terminal of the subtraction and amplification unit are respectively connected to the location voltage conversion unit, the D/A converter unit and the A/D converter unit, and the subtraction and amplification unit is configured to perform subtraction and amplification on an input voltage.

Optionally, the medium location detecting unit may include a light detecting unit.

The light detecting unit may include a light emitting terminal and a light sensitive terminal; and the light emitting terminal and the light sensitive terminal may be respectively installed at opposite sides of a transmission channel for the detected medium.

Optionally, the subtraction and amplification unit may be an independent subtraction and amplification circuit.

Optionally, the subtraction and amplification unit may be a circuit set including a subtracter and an amplifier.

Optionally, the control processor may be connected to a host device; and the host device may be configured to receive a thickness detection result of the detected medium.

The embodiments of the present disclosure provide a method for detecting a thickness of a sheet medium with the device for detecting the thickness of the sheet medium described above, which method includes:

S1: delaying for a preset time duration $T_d$ after the device is started;

S2: outputting compensation data with a value of 0 to the D/A converter, reading thickness data processed by the A/D converter and processing the thickness data to obtain actual compensation data, in a case where no detected medium is detected by the medium location detecting unit and the timer unit is in a stop state;

S3: starting the timer unit in a case where a detected medium is detected by the medium location detecting unit;

S4: outputting compensation data with a value of 0 to the D/A converter, reading thickness data processed by the A/D converter and processing the thickness data to obtain actual compensation data, in a case where a reading of the timer unit is less than a difference $T_m$ between a time duration $T_a$ in which the detected medium moves from the medium location detecting unit to the thickness sensor and the preset time duration $T_d$;

S5: stopping calculating the compensation data and outputting the actual compensation data to the D/A converter by the control processor, in a case where the reading of the timer unit is equal to $T_m$;

S6: reading the thickness data processed by the A/D converter to obtain a real-time thickness of the detected medium which is passing the thickness sensor, in a case where the reading of the timer unit is greater than or equal to $T_a$;

S7: recording a reading $T_c$ of the timer unit upon detection of leaving of the detected medium by the medium location detecting unit;

S8: stopping reading the thickness data and outputting compensation data with the value of 0 to the D/A converter by the control processor, in a case where the reading of the timer unit is equal to $T_c+T_a$; and S9: initializing the device in a case where the reading of the timer unit is greater than or equal to $T_c+T_a+T_d$.

Optionally, after step S8 and before step S9, the method may further include:

sending an actual thickness of the detected medium to the host device, where the host device is connected to the control processor.

In the embodiments of the present disclosure, the device for detecting the thickness of the sheet medium includes: the thickness sensor, the location voltage conversion unit, the A/D converter and the control processor connected in sequence. The device further includes the medium location detecting unit, the timer unit, the D/A converter and the subtraction and amplification unit. The medium location detecting unit is connected to the control processor and is configured to detect whether a detected medium passes. The timer unit is connected to the control processor and is configured to record the running time of the device according to the preset rule. The two terminals of the D/A converter are respectively connected to the control processor and the inverting input terminal of the subtraction and amplification unit, and the D/A converter is configured to convert a digital signal into an analog signal. The non-inverting input terminal, the inverting input terminal and an output terminal of the subtraction and amplification unit are respectively connected to the location voltage conversion unit, the D/A converter unit and the A/D converter unit, and the subtraction and amplification unit is configured to perform subtraction and amplification to the input voltage. In the device and the method for detecting the thickness of the sheet medium, before the A/D converter, the subtraction and amplification unit is arranged to eliminate the effect of the zero voltage of the thickness voltage and amplify the thickness voltage appropriately, thereby improving the sensitivity of the device for detecting the thickness of the sheet medium while eliminating the effect of the zero voltage.

BRIEF DESCRIPTION OF THE DRAWINGS

The drawings to be used in the description of the embodiments or the conventional technology will be described briefly as follows, so that the technical solutions according to the embodiments of the present disclosure or according to the conventional technology will become clearer. It is apparent that the drawings in the following description only illustrate some embodiments of the present disclosure. For those skilled in the art, other drawings may be obtained according to these drawings without any creative work.

DETAILED DESCRIPTION

In a device and a method for detecting a thickness of a sheet medium according to embodiments of the present disclosure, before an A/D converter, a subtraction and amplification unit is arranged to eliminate an effect of a zero voltage of a thickness voltage and amplify the thickness voltage appropriately, thereby improving sensitivity of the device for detecting the thickness of the sheet medium while eliminating the effect of the zero voltage.

Figure 1:
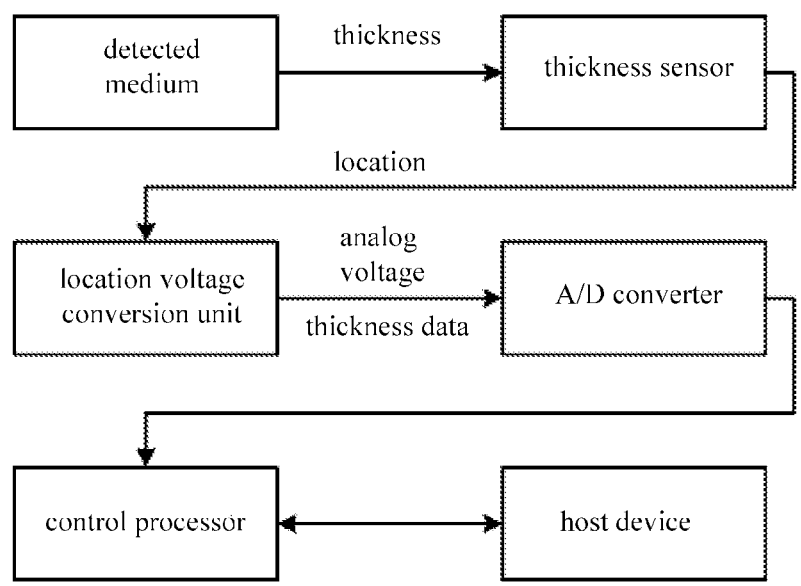
FIG. 1 is a schematic structural diagram of a thickness measuring device according to the convention technology.
Figure 2:
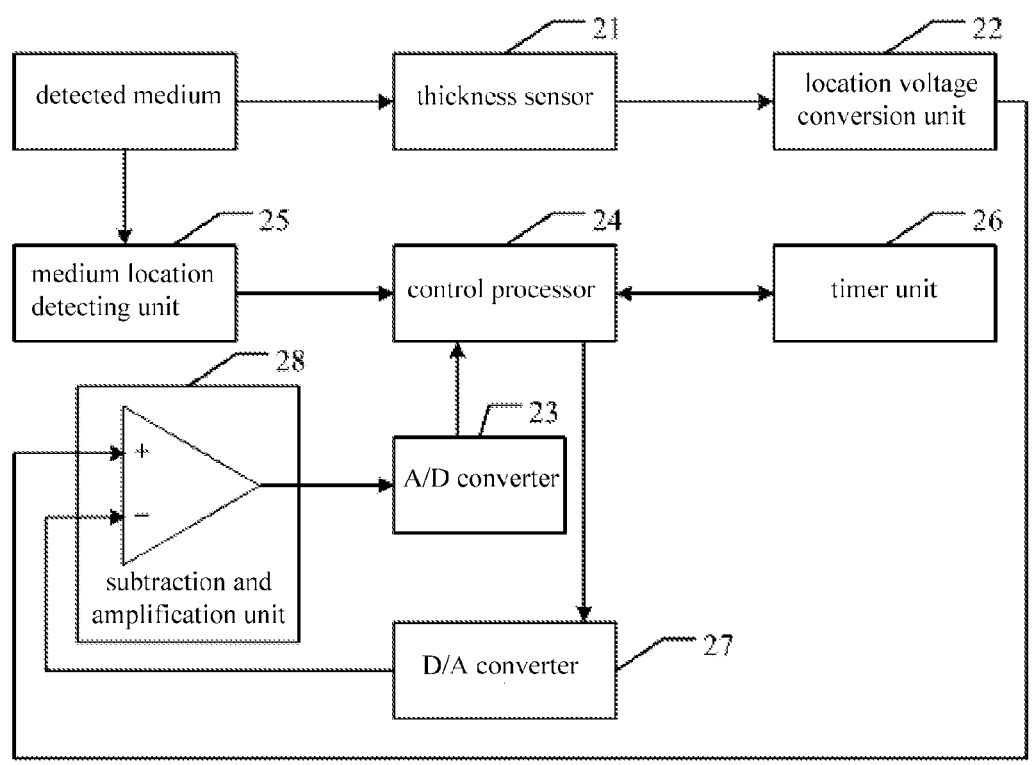
FIG. 2 is a schematic structural diagram of a device for detecting a thickness of a sheet medium according to an embodiment of the present disclosure.
Figure 3:
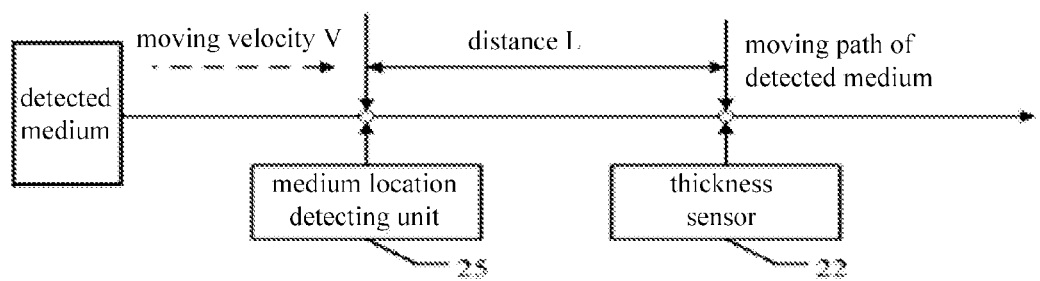
FIG. 3 is a schematic diagram of location layout of a medium location detecting unit and a thickness sensor in the device for detecting the thickness of the sheet medium according to the embodiment of the present disclosure.

Referring to FIGS. 2 and 3, a device for detecting a thickness of a sheet medium according to an embodiment of the present disclosure includes a thickness sensor 21, a location voltage conversion unit 22, an A/D converter 23 and a control processor 24 connected in sequence. The above device further includes a medium location detecting unit 25, a timer unit 26, a D/A converter 27 and a subtraction and amplification unit 28.

The medium location detecting unit 25 is connected to the control processor 24 and is configured to detect whether a detected medium passes.

The timer unit 26 is connected to the control processor 24 and is configured to record a running time of the device according to a preset rule.

Two terminals of the D/A converter 27 are respectively connected to the control processor 24 and an inverting input terminal of the subtraction and amplification unit 28, and the D/A converter 27 is configured to convert a digital signal into an analog signal.

A non-inverting input terminal, the inverting input terminal and an output terminal of the subtraction and amplification unit 28 are respectively connected to the location voltage conversion unit 22, the D/A converter unit 27 and the A/D converter unit 23, and the subtraction and amplification unit 28 is configured to perform subtraction and amplification to an input data.

Before the device for detecting the thickness of the sheet medium according to the embodiment of the present disclosure operates, an initialization operation is performed to the device and the timer unit 26 is reset. When the device operates, the medium location detecting unit 25 continuously detects whether a detected medium reaches. It should be noted that, state information of the medium location detecting unit 25 may be 0 before the detected medium reaches, and may be 1 after the detected medium reaches. Before the medium reaches, the control processor 24 outputs compensation data with a value of 0 to the D/A converter 27, reads and processes thickness data processed by the A/D converter 23, to obtain actual compensation data. In a case where the detected medium is detected by the medium location detecting unit 25, the timer unit 26 is started. In a case where a reading of the timer unit 26 is less than a difference $T_m$ between a time duration $T_a$, in which the detected medium moves from the medium location detecting unit 25 to the thickness sensor 21 and a preset time duration $T_d$, the control processor 24 outputs compensation data with value of 0 to the D/A converter 27, reads and processes thickness data processed by the A/D converter, to obtain actual compensation data. In a case where the reading of the timer unit 26 is equal to $T_m$, the control processor 24 stops calculating the compensation data and outputs the actual compensation data to the D/A converter 27. In a case where the reading of the timer unit 26 is greater than or equal to $T_a$, the control processor 24 reads thickness data processed by the A/D converter, to obtain a real-time thickness of the detected medium which is passing the thickness sensor. Upon detection of leaving of the detected medium by the medium location detecting unit 25, a reading $T_c$ of the timer unit 26 is recorded. In a case where the reading of the timer unit 26 is equal to $T_c+T_a$, the control processor 24 stops reading the thickness data and obtains an actual thickness of the detected medium, and outputs compensation data with the value of 0 to the D/A converter 27. In a case where the reading of the timer unit 26 is greater than or equal to $T_c+T_a+T_d$, the device is initialized, and a next thickness measurement may be started.

Referring to FIG. 3, in a case where the medium moves at a uniform velocity, the above $T_a$ may be determined based on a moving velocity V of the detected medium and a distance L between the medium location detecting unit 25 and the thickness sensor 21, that is, $T_a=L/V$. $T_d$ is a time duration for delaying from a time instant when the control processor 24 sends the compensation data to the D/A converter 27 to a time instant when the thickness data becomes valid, that is, a time duration required for a process as follows: after the control processor 24 sends the compensation data, the compensation data is converted by the D/A converter 27, the subtraction and amplification unit 28 processes input data based on a compensation voltage, and the A/D converter 23 converts the processed input data to obtain the thickness data.

Optionally, the medium location detecting unit 25 may include a light detecting unit; and the light detecting unit may include a light emitting terminal and a light sensitive terminal, the light emitting terminal and the light sensitive terminal may be respectively installed at opposite sides of a transmission channel for the detected medium.

The medium location detecting unit 25 may be a light detecting unit is composed of two parts, a light emitting terminal A and a light sensitive terminal B. Light emitted by the light emitting terminal A irradiates on the light sensitive terminal B, and B converts the light into a voltage signal based on intensity of the light, and outputs the voltage signal. In a case where no medium shelters a light path between A and B (or no medium passes the light path), a voltage outputted by B is relatively low. In a case where the light path between A and B is sheltered by a medium (or a medium passes the light path), the voltage outputted by B is relatively high. In a case that the voltage outputted by B is lower than a threshold, the medium location detecting unit outputs a state signal with a value of 0, or in a case that the voltage outputted by B is higher than the threshold, the medium location detecting unit outputs a state signal with a value of 1. It should be noted that, the above threshold is a preset voltage value which is generally half of a supply voltage.

Optionally, the subtraction and amplification unit may be an independent subtraction and amplification circuit.

Optionally, the subtraction and amplification unit may be a circuit set including a subtracter and an amplifier.

Optionally, the control processor may be connected to a host device; and the host device may be configured to receive a thickness detection result of the detected medium.

The device for detecting the thickness of the sheet medium according to the embodiment of the present disclosure includes the thickness sensor 21, the location voltage conversion unit 22, the A/D converter 23 and the control processor 24 connected in sequence. The above device further includes the medium location detecting unit 25, the timer unit 26, the D/A converter 27 and the subtraction and amplification unit 28. The medium location detecting unit 25 is connected to the control processor 24 and is configured to detect whether a detected medium passes. The timer unit 26 is connected to the control processor 24 and is configured to record the running time of the device according to the preset rule. The two terminals of the D/A converter 27 are respectively connected to the control processor 24 and the inverting input terminal of the subtraction and amplification unit 28, and the D/A converter is configured to convert a digital signal into an analog signal. The non-inverting input terminal, the inverting input terminal and an output terminal of the subtraction and amplification unit 28 are respectively connected to the location voltage conversion unit 22, the D/A converter unit 27 and the A/D converter unit 23, and the subtraction and amplification unit is configured to perform subtraction and amplification on the input voltage. In the device for detecting the thickness of the sheet medium, before the A/D converter, the subtraction and amplification unit is arranged to eliminate the effect of the zero voltage of the thickness voltage and amplify the thickness voltage appropriately, thereby improving the sensitivity of the device for detecting the thickness of the sheet medium while eliminating the effect of the zero voltage.

Figure 4:
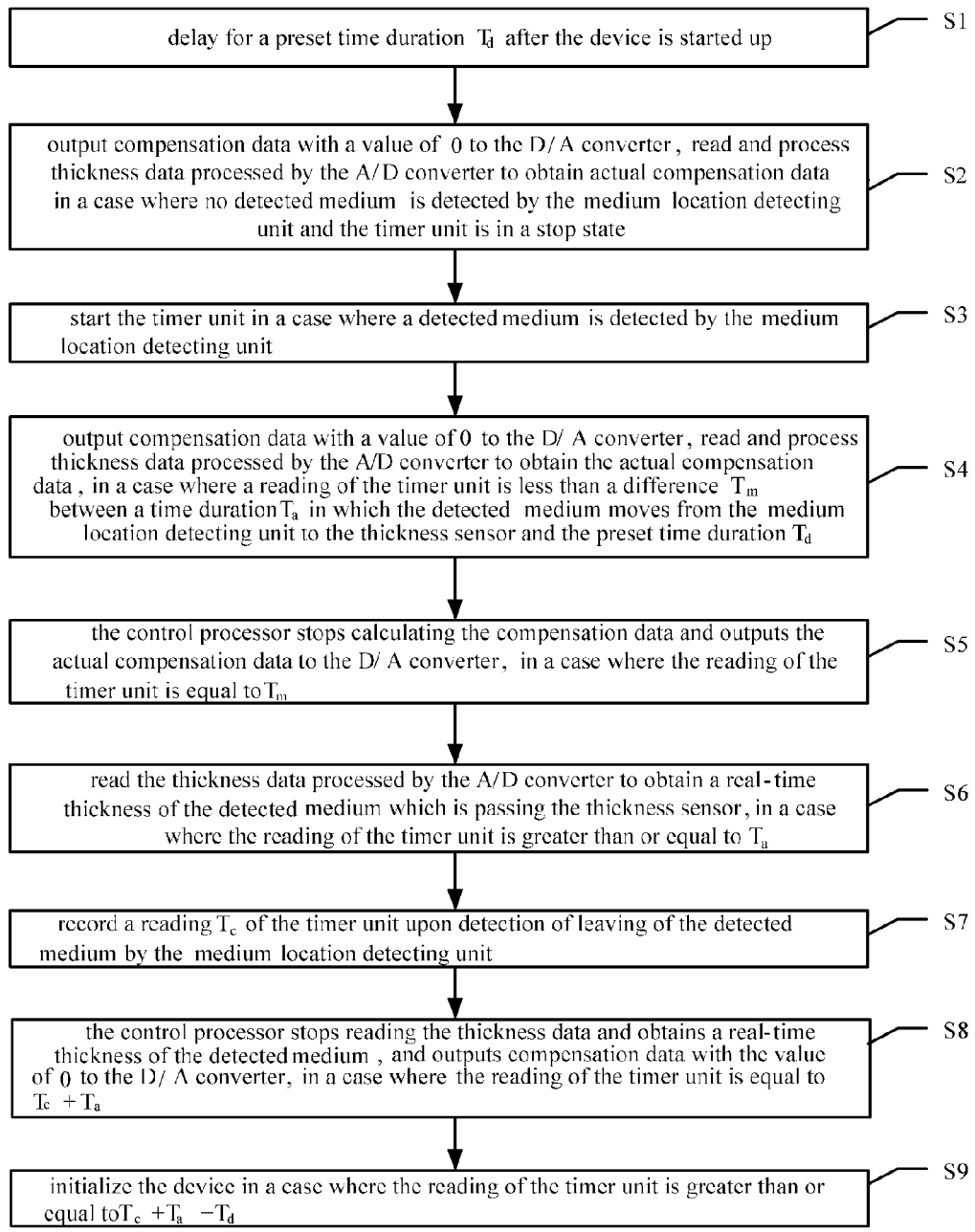
FIG. 4 is a flowchart of a method for detecting a thickness of a sheet medium according to an embodiment of the present disclosure.

In the above, the device for detecting the thickness of the sheet medium according to the embodiments of the present disclosure is described briefly. In the following, a method for detecting a thickness of a sheet medium according to the embodiments of the present disclosure is described in detail. Referring to FIG. 4, the method for detecting the thickness of the sheet medium includes steps S1 to S9.

In S1, delaying for a preset time duration $T_d$ after the device is started.

The device according to the present disclosure waits for the preset time duration $T_d$ after being started. The above preset time duration $T_d$ is an effective time duration for delaying from a time instant when the control processor sends compensation data to the D/A converter to a time instant when thickness data becomes valid, that is, a time duration during which the control processor sends the compensation data, the D/A converter converts the compensation data, the subtraction and amplification unit processes the converted compensation data based on an compensation voltage, and the A/D converter converts the processed compensation data to obtain thickness data.

In S2, compensation data with a value of 0 is outputted to the D/A converter, thickness data processed by the A/D converter is read and processed, to obtain actual compensation data, in a case where no detected medium is detected by the medium location detecting unit and the timer unit is in a stop state.

After delaying for the preset time duration $T_d$, in a case that no detected medium is detected by the medium location detecting unit and the timer unit is in the stop state, this indicates that the detected medium does not reach the medium location detecting unit and the thickness sensor. In this case, an output location of the thickness sensor is $X_0$, and a voltage outputted by the location voltage conversion unit is a zero voltage $U_0$. The control processor outputs the compensation data with the value of 0 to the D/A converter, such that a voltage on an inverting input terminal of the subtraction and amplification unit is 0, that is, there is no compensation performed. Therefore, zero voltage data can be obtained in a way of directly reading output data of the A/D converter. And the actual compensation data can be obtained based on the zero voltage data.

In S3, the timer unit is started in a case where it is determined that a detected medium is detected by the medium location detecting unit.

The timer unit may be started in a case where the actual compensation data is obtained and the detected medium is detected by the medium location detecting unit.

In S4, compensation data with a value of 0 is outputted to the D/A converter, and thickness data processed by the A/D converter is read and processed to obtain actual compensation data, in a case where a reading of the timer unit is determined to be less than a difference $T_m$ between a time duration $T_a$ during which the detected medium moves from the medium location detecting unit to the thickness sensor and the preset time duration $T_d$.

In a case that the reading of the timer unit is determined to be less than the difference $T_m$ between the time duration $T_a$ during which the detected medium moves from the medium location detecting unit to the thickness sensor and the preset time duration $T_d$, that is, the detected medium has not reached the thickness sensor, the control processor 24 continues outputting the compensation data with the value of 0 to the D/A converter, reads and processes the thickness data processed by the A/D converter to obtain the actual compensation data.

In S5, the control processor stops calculating the compensation data, and outputs the actual compensation data to the D/A converter in a case where the reading of the timer unit is determined to be equal to $T_m$.

In a case that the reading of the timer unit is determined to be equal to $T_m$, the detected medium will reach the thickness sensor soon. In this case, the control processor stops calculating the compensation data and outputs the actual compensation data to the D/A converter.

In S6, in a case where the reading of the timer unit is greater than or equal to $T_a$, the thickness data processed by the A/D converter is read to obtain a real-time thickness of the detected medium which is passing the thickness sensor.

In a case that the reading of the timer unit is determined to be greater than or equal to $T_a$, the detected medium is passing the thickness sensor. In this case, the control processor remains the actual compensation data which is outputted to the D/A converter unchanged, and reads the thickness data processed by the A/D converter, to obtain the real-time thickness of the detected medium which is passing the thickness sensor.

In S7, a reading $T_c$ of the timer unit is recorded upon detection of leaving of the detected medium by the medium location detecting unit.

The reading $T_c$ of the timer unit is recorded upon detection of leaving of the detected medium by the medium location detecting unit.

In S8, the control processor stops reading the thickness data and obtains the real-time thickness of the detected medium, and outputs compensation data with the value of 0 to the D/A converter, in a case where the reading of the timer unit is determined equal to $T_c+T_a$.

In a case that the reading of the timer unit is determined equal to $T_c+T_a$, the detected medium leaves the thickness sensor. In this case, the control processor stops reading the thickness data and obtains the actual thickness of the detected medium, and outputs the compensation data with the value of 0 to the D/A converter.

In S9, the device is initialized in a case where the reading of the timer unit determined to be greater than or equal to $T_c+T_a+T_d$.

In a case that the reading of the timer unit is determined to be greater than or equal to $T_c+T_a+T_d$, the device has completed the measurement for the detected medium and the data transmission. In this case, the device may be initialized for next measurement.

In the following, an operating flow of the embodiment of the present disclosure is described in detail by an example.

In a case where no subtraction and amplification unit is provided in the device according to the embodiment of the present disclosure, assuming that a drift range of zero voltage is ±0.5V, a thickness measuring range is 0~250 μm, an input voltage range of the A/D converter is 0-3.3V. In this case, a voltage of 0.5V on the A/D input terminal indicates that no medium passes the thickness sensor, and a voltage of 1.42V on the A/D input terminal indicates that a medium with a thickness of 100 μm passes the thickness sensor, and here a voltage amplitude is 0.92V. If the number of bits of the A/D converter is eight, each word in the thickness data corresponds to a thickness of 1.4 μm (3.3*250/2.3/256). In this case, the measuring device can distinguish a thickness fluctuation which exceeds 1.4 μm. In a case that an adhesive tape with a thickness of 20 μm is adhered on the surface of the detected medium, a change amount of the thickness data is 14 words.

Under the same preconditions, in a case where the subtraction and amplification unit is arranged to eliminate the zero voltage and amplify the voltage 1.43 (3.3/2.3=1.43) times, the voltage of 0.0V on the A/D input terminal indicates that no medium passes the thickness sensor, and the voltage on the A/D input terminal is 1.31V in a case that the medium with the thickness of 100 μm passes the thickness sensor. With the same A/D conversion parameters, each word in the thickness data corresponds to a thickness of 1.0 μm. In this case, the measuring device can distinguish a thickness fluctuation which exceeds 1.0 μm. If an adhesive tape with a thickness of 20 μm is adhered on the surface of the detected medium, a change amount of the thickness data is 20 words which is 6 words more than that in a case that no subtraction and amplification unit is used, so that the controller can easily distinguish the adhesive tape region.

Optionally,
after step S8 and before step S9, the method may further include:

sending an actual thickness of the detected medium to the host device; and
where the host device is connected to the control processor.

In the method for detecting the thickness of the sheet medium, before the A/D converter, the subtraction and amplification unit is arranged to eliminate the effect of the zero voltage of the thickness voltage and amplify the thickness voltage appropriately, thereby improving the sensitivity of the device for detecting the thickness of the sheet medium while eliminating the effect of the zero voltage effect. In addition, a resolution of thickness measurement is also improved due to more effective words in the output data of the A/D converter.

It should be understood by those skilled in the art that, all or parts of the steps in the method according to the above embodiment can be completed by instructing related hardware using a program. The program may be stored in a computer readable storage medium which may be a read only memory, a magnetic disk, an optical disk or the like.

In the above, the device and method for detecting the thickness of the sheet medium according to the present disclosure is described in detail. Changes may be made to the embodiments and the application range by those skilled in the art without departing from the concept of the embodiments of the present disclosure. In summary, the above description should not be understood as limitation of the present disclosure.

The invention claimed is:

1. A device for detecting a thickness of a sheet medium, comprising:
   a thickness sensor, a location voltage conversion unit, an A/D converter and a control processor which are connected in the sequence listed,
   a medium location detecting unit,
   a timer unit,
   a D/A converter, and
   a subtraction and amplification unit, wherein
   the thickness sensor is configured to detect a thickness of a detected medium and output a location signal indicating the thickness of the detected medium;
   the location voltage conversion unit is configured to convert the location signal outputted from the thickness sensor into a voltage signal;
   the medium location detecting unit is connected to the control processor and is configured to detect whether the detected medium passes;
   the timer unit is connected to the control processor and is configured to record a running time of the device according to a preset rule, wherein the timer unit resets before detection of the detected medium and starts when the medium location detecting unit detects the detected medium;
   two terminals of the D/A converter are connected to the control processor and an inverting input terminal of the subtraction and amplification unit respectively, and the D/A converter is configured to convert a digital signal into an analog signal;
   a non-inverting input terminal for receiving the voltage signal from the location voltage conversion unit, the inverting input terminal and an output terminal of the subtraction and amplification unit are connected to the location voltage conversion unit, the D/A converter and the A/D converter respectively, and the subtraction and amplification unit is configured to perform subtraction and amplification on the voltage signal and the analog signal; and the control processor is configured to:
output compensation data with a value of 0 to the D/A converter, read and process thickness data processed by the A/D converter, to obtain actual compensation data, before the detected medium arrives at the medium location detecting unit;
output compensation data with value of 0 to the D/A converter, read and process thickness data processed by the A/D converter, to obtain actual compensation data, in a case where a reading of the timer unit is less than a difference $T_m$ between a time duration $T_a$ in which the detected medium moves from the medium location detecting unit to the thickness sensor and a preset time duration $T_d$;
stop calculating the compensation data and output the actual compensation data to the D/A converter, in a case where the reading of the timer unit is equal to $T_m$;
read thickness data processed by the A/D converter, to obtain a real-time thickness of the detected medium which is passing the thickness sensor, in a case where the reading of the timer unit is greater than or equal to $T_a$; and
stop reading the thickness data, obtain an actual thickness of the detected medium, and output compensation data with the value of 0 to the D/A converter, in a case where the reading of the timer unit is equal to $T_c+T_a$, wherein $T_c$ is the reading of the timer unit upon detection of leaving of the detected medium by the medium location detecting unit;
wherein the device is initialized in a case where the reading of the timer unit is greater than or equal to $T_c+T_a+T_d$.

2. The device for detecting the thickness of the sheet medium according to claim 1, wherein
the medium location detecting unit comprises a light detecting unit;
the light detecting unit comprises a light emitting terminal and a light sensitive terminal; and
the light emitting terminal and the light sensitive terminal are respectively installed at opposite sides of a transmission channel for the detected medium.

3. The device for detecting the thickness of the sheet medium according to claim 1, wherein the subtraction and amplification unit is an independent subtraction and amplification circuit.

4. The device for detecting the thickness of the sheet medium according to claim 1, wherein the subtraction and amplification unit is a circuit set comprising a subtracter and an amplifier.

5. The device for detecting the thickness of the sheet medium according to claim 1, wherein the control processor is connected to a host device, and the host device is configured to receive a thickness detection result of the detected medium.

6. A method for detecting a thickness of a sheet medium, comprising:
S1: delaying for a preset time duration $T_d$;
S2: outputting compensation data with a value of 0 to a D/A converter, reading and processing thickness data processed by an A/D converter to obtain actual compensation data, in a case where no detected medium is detected by a medium location detecting unit and a timer unit is in a stop state;
S3: starting the timer unit in a case that the medium location detecting unit detects a detected medium;
S4: outputting compensation data with a value of 0 to the D/A converter, reading and processing thickness data processed by the A/D converter to obtain actual compensation data, in a case that a reading of the timer unit is less than a difference $T_m$ between a time duration in which the detected medium moves from the medium location detecting unit to a thickness sensor and the preset time duration $T_d$;
S5: stopping calculating compensation data and outputting the actual compensation data to the D/A converter by a control processor, in a case that the reading of the timer unit is equal to $T_m$;
S6: reading the thickness data processed by the A/D converter to obtain a real-time thickness of the detected medium which is passing the thickness sensor, in a case that the reading of the timer unit is greater than or equal to $T_a$;
S7: recording a reading $T_c$ of the timer unit upon detection of leaving of the detected medium by the medium location detecting unit;
S8: stopping reading the thickness data, and outputting compensation data with the value of 0 to the D/A converter by the control processor, in a case that the reading of the timer unit is equal to $T_c+T_a$; and
S9: initializing the D/A converter, the A/D converter, the medium location detecting unit, the timer unit, the thickness sensor and the control processor in a case that the reading of the timer unit is greater than or equal to $T_c+T_a+T_d$.

7. The method for detecting the thickness of the sheet medium according to claim 6, wherein after step S8 and before step S9, the method further comprises:
sending an actual thickness of the detected medium to a host device, wherein the host device is connected to the control processor.

* * * * *